United States Patent

McCall et al.

(10) Patent No.: US 6,544,322 B2
(45) Date of Patent: Apr. 8, 2003

(54) PRINTING INKS HAVING LOW VOLATILE ORGANIC COMPOUNDS AND METHODS OF PRODUCING SAME

(75) Inventors: Clay McCall, Charlotte, NC (US); Ricky V. Mitchell, Whitehouse, OH (US); Doreen E. Smith, Belleville, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 8 days.

(21) Appl. No.: 09/755,565

(22) Filed: Jan. 5, 2001

(65) Prior Publication Data

US 2002/0148384 A1 Oct. 17, 2002

(51) Int. Cl.$^7$ ................................................. C09D 11/02
(52) U.S. Cl. ................ 106/31.4; 106/31.41; 106/31.72; 106/31.73
(58) Field of Search ............................. 106/31.4, 31.41, 106/31.72, 31.73

(56) References Cited

U.S. PATENT DOCUMENTS

| | | | |
|---|---|---|---|
| 2,964,532 A | 12/1960 | Klenke | 260/314.5 |
| 3,107,248 A | 10/1963 | Cooper | 260/279 |
| 3,188,318 A | 6/1965 | Mack | 260/314.5 |
| 4,956,464 A | 9/1990 | Bender et al. | 546/57 |
| 5,166,245 A | 11/1992 | Zuraw | 524/270 |
| 5,302,193 A * | 4/1994 | Wouch et al. | 101/170 |
| 5,393,331 A * | 2/1995 | Loria et al. | 106/31.27 |
| 5,538,548 A | 7/1996 | Yamazaki | 106/20 C |
| 5,622,548 A * | 4/1997 | Zou et al. | 106/31.26 |
| 5,725,646 A * | 3/1998 | Krishnan et al. | 106/31.69 |
| 5,755,872 A | 5/1998 | Urban et al. | 106/495 |
| 5,778,789 A * | 7/1998 | Krishnan et al. | 101/450.1 |
| 5,954,866 A * | 9/1999 | Ohta et al. | 106/31.68 |
| 6,235,916 B1 * | 5/2001 | Thames et al. | 106/252 |

FOREIGN PATENT DOCUMENTS

| | | | |
|---|---|---|---|
| EP | 0 525 538 A2 | 2/1993 | C09B/5/62 |
| EP | 1 057 843 A1 | 12/2000 | C08G/18/38 |
| JP | 55164265 | 12/1980 | C09D/11/10 |
| JP | 10139839 | 5/1998 | C08F/290/06 |
| JP | 11246773 | 9/1999 | C08L/93/94 |
| JP | 2000219833 | 8/2000 | C09D/11/02 |
| SU | 648591 | 2/1979 | C09D/11/10 |
| WO | WO 00/56827 | 9/2000 | C09D/175/06 |

* cited by examiner

*Primary Examiner*—Mark L. Bell
*Assistant Examiner*—Veronica F. Faison
(74) *Attorney, Agent, or Firm*—Sidney Persley

(57) ABSTRACT

A printing ink composition containing resin and glycerine, wherein the composition has less than 5 wt. % volatile organic compounds and has no hazardous air pollutants and a method of preparing such composition.

19 Claims, No Drawings

PRINTING INKS HAVING LOW VOLATILE ORGANIC COMPOUNDS AND METHODS OF PRODUCING SAME

FIELD OF THE INVENTION

This invention relates to printing ink compositions having less than 5 percent by weight (wt. %) of volatile organic compounds (VOCs) and no hazardous air pollutants. More specifically, this invention relates to the use of glycerine in printing ink formulations to dissolve the resin, thereby reducing the need for employing VOCs.

BACKGROUND OF THE INVENTION

VOCs are photoreactive chemicals that contain elemental carbon that can lead to ozone formation. In the printing ink industry, VOCs are used to control the properties of the printing ink. Each VOC is property specific. For example, an alcohol is used to decrease the drying time of an ink and a glycol would be used to increase the drying time of the same ink. These chemicals may also affect the printability properties of the ink such as lay, color, shade and strength, and rub resistance to name a few and may further affect the processing and rheological (flow) properties of the printing ink as well.

The benchmark for desired reaction rates of hydrocarbon-based compounds or VOCs is ethane. If a compound has a reaction rate with the hydroxyl radical and ultraviolet ("UV") light that is faster than ethane, the compound reacts too close to the ground and consequently generates ozone and smog. Such compounds are defined as volatile organic compounds (VOCs). On the other hand, if a compound has a reaction rate that is slower than ethane, then the compound reaches higher into the atmosphere before reacting with the hydroxyl radical and UV light. In such instances, such compound does not contribute to the formation of ground based ozone and smog and therefore, is not considered a VOC.

The printing ink industry has a need to reduce VOC emissions as a result of state and federal health, safety and environmental laws and regulations, which affect printers. This has caused the industry to search for alternate chemicals, which would reduce the VOC levels and yet maintain or even enhance the properties of the ink. Another concern is the presence of hazardous air pollutants (HAPs) employed in printing inks which under the Federal Clean Air Act (FCAA) and Environmental Protection Agency (EPA), printers will perhaps be required to keep HAPs emission inventories.

Diethylene glycol, a common ingredient in aqueous letterpress printing inks, is an example of a VOC, while ethylene glycol is considered to be a VOC and a HAP.

In the United States, if a manufacturer emits air pollutants which must be controlled (such as VOCs or HAPs), the federal guidelines dictate adopting one of two courses of action to mitigate their emissions. The first is using engineering controls such as thermal or catalytic afterburners. This of course is a primary economic concern from the capital and operation perspective. The second is employing an alternate technology to reduce the amounts of VOCs and HAPs.

SUMMARY OF THE INVENTION

The present invention provides a printing ink composition comprising a resin and glycerine having less than 5 wt. % VOC and no HAPs.

The present invention also provides a printing ink composition additionally comprised of monoethanolamine, having less than 3 wt. % VOC and no HAPs.

The present invention further provides a method of preparing an aqueous letterpress or flexographic printing ink compositions containing resin and using glycerine to dissolve the resin, wherein said ink composition has less than 5 wt. % VOC and no HAPS.

Other objects and advantages of the present invention will become apparent from the following description and appended claims.

DETAILED DESCRIPTION OF THE INVENTION

It has been found that the use of glycerine as a primary solvent for a printing ink resin imparts good flow properties and sufficient press stability to the ink without compromising on print quality and allows for the production of printing inks having no HAPs and a VOC content of less than 5 wt. %.

Preferably, the resin suitable for use in the present invention is maleic, acrylic or a combination thereof and the glycerine is preferably present at a concentration of about 25 to 80 wt. %, more preferably at 40 to 60 wt. %.

Commercial letterpress or flexographic water-washable printing inks often have a high VOC content. For example, Sun Chemical Corporation, Fort Lee, N.J. has available inks such as HydroSet, containing high VOCs.

HydroSet has a history of good printing performance and customer satisfaction. Therefore, a successful low VOC, HAPs free alternate to HydroSet would be required to exhibit the printing and end-use press performance the letterpress and flexographic printing industries have come to expect from HydroSet, as well as offering the equivalent manufacturing ease in production. Acceptable press performance requires that the printing ink stay wet (or "open") on the printing press, but dry rapidly enough on the substrate being printed so as not to smear or "track" on the substrate. The prints must also offer the color strength and gloss equivalent to the standard established by HydroSet.

A number of solvent and resin combinations were evaluated as alternates to HydroSet. All except one, where the vehicle selected is dissolved in glycerine, failed in performance related either to its insufficient press stability or to poor print quality. Since glycerine is a no-HAPs and non-VOC material, the use of the glycerine in a vehicle as demonstrated below in the examples, provided the press stability and print quality equivalent to printing inks formulated with the "standard" HydroSet.

Accordingly, under the present invention low VOC letterpress and flexographic printing inks for use in paper packaging, for example, (hereafter referred to as "Compliant Ink") were formulated having a much lower VOC content than other commercially available letterpress and flexographic printing inks used in paper packaging. In addition, unlike many of the currently available printing inks for this particular application, the ink contained no HAPs materials. Lab evaluation of open time and press stability was made by observing the change in tack of the ink as it was run on an Inkometer; a machine with rotating rollers that simulates the action of rollers on a printing press. Ink transfer and print quality were evaluated with the use of a Vandercook proofing press.

Table 1 shows the composition for a typical non-Compliant water-washable letterpress or flexographic ink (HydroSet) used for paper packaging where the VOC content is 374.5 grams/liter (29.1%). The percentages expressed below are based on the total weight of the printing ink.

TABLE 1

| INGREDIENT DESCRIPTION | INGREDIENT (wt.) | VOC CONTENT (%) |
|---|---|---|
| Maleic Resin | 26.3 | 0 |
| Acrylic Resin | 5.3 | 0 |
| Diethylene Glycol | 16.2 | 16.2 |
| Ethylene Glycol | 9.9 | 9.9 |
| Water | 7.2 | 0 |
| Monoethanolamine | 1.9 | 1.9 |

Table 2 shows a composition for a Compliant Ink where the VOC content is only 24.4 grams/liter (1.9%).

TABLE 2

| INGREDIENT DESCRIPTION | INGREDIENT (wt.%) | VOC CONTENT (%) |
|---|---|---|
| Maleic Resin | 10.7 | 0 |
| Acrylic Resin | 5.9 | 0 |
| Glycerine | 43.6 | 0 |
| Monoethanolamine | 1.9 | 1.9 |

The invention is illustrated in even more detail by the following specific examples, but those of ordinary skill in the art will understand that the inveniton is not limited to the details thereof and that changes may be made without departing from the scope of the invention.

EXAMPLE 1

HydroSet GCMI 74 Red (available from Sun Chemical Corporation, Fort Lee, N.J.) was used as a standard for comparing the performance and properties of the experimental ink formulas under the present invention.

Results for the Tack Stability Test for HydroSet GCMI 74 Red were:

| ELAPSED TIME (minutes) | TACK |
|---|---|
| 1 | 11.0 |
| 2 | 14.0 |
| 3 | 17.0 |
| 4 | 18.5 |
| 5 | 21.0 |

The results indicate that tack began decreasing at 13 minutes, an indication that the ink was drying on rollers. The tack was checked on a Model B45 (manual) Twing-Albert Inkometer at 800 RPM. Tack of production batches were read at 1 minute. For evaluation of reformulation variables, tack was read at 1, 2, 3, 4, and 5 minutes and then allowed to run until the ink dried, with a notation of the lapsed time until drying on the rollers occurred.

After the tack was verified to be within specification, the sample was readied for printing on a Vandercook Proof Press. Using an S & V Volummeter, the standard print film thickness was obtained by filling the volumeter to 13 clicks. The ink was applied to the bed of the press and rolled out to a uniform thickness with a hand brayer. The ink is transferred to the plate with the brayer. GCMI Edition VIII stock was used as the substrate and strips of each were put together for a single print on three different substrates. The stock was inserted in the press grippers and the prints were made by bringing the substrate into contact with the ink. The plate should be adequately shimmed so as to insure proper print impression. The prints were then air dried for color comparison and for rub test performance. The prints were dried at 100° F. for 8 minutes.

EXAMPLE 2

The stability of several experimental variations of HydroSet GCMI 74 Red using different solvents were evaluated. The open time test results are shown below in Table 3.

TABLE 3

| Resin Type | Resin Solvent | Let-Down Solvent | Open Time (minutes) |
|---|---|---|---|
| Maleic/Acrylic | EG/DEG | DEG | 13.0 |
| Maleic | PG | PG | 4.0 |
| Maleic | PG | DEG | 5.0 |
| Maleic/Acrylic | PG | PG | 3.5 |
| Maleic/Acrylic | PG | DEG | 3.5 |
| Maleic/Acrylic | PG | DEG + 6% Cup grease | Dried Immed. |

PG—propylene glycol; EG—ethylene glycol; and DEG—diethylene glycol

We observed that none of the printing inks formulated with resin and propylene glycol had adequate open time.

EXAMPLE 3

Printing inks containing both glycerine and Polyglycol E300 (a polyethylene glycol) were formulated and selected for evlauation as representative non-VOC and non-toxic printing inks (i.e. compliant inks) under the present invention. Data were obtained (see Table 4) for a standard Hydroset GCMI 74 Red and six experimental variations.

VOC data was derived by computation, with inks containing ethylene glycol, diethylene glycol, and propylene glycol considered 100% VOCs. The solvent VOC data does not include the amines in the ink, which are estimated to be below 32 gram/liter.

Method for Calculating Theoretical VOC (Grams/Liter)

The following method was used for calculating theoretical VOC (gms/L).

$$WT/GAL\ INK \div WT/GAL\ WATER = SPECIFIC\ GRAVITY \quad (1)$$

Thus, for a production sample of HS GCMI 74 Red (HydroSet): 10.74 lbs./gal.÷8.345 lbs./gal.=1.287 specific gravity.

$$SPEC.\ GRAV.\ OF\ INK \times 1,000\ GRAMS = GRAMS/LITER\ OF\ INK\ (2)$$

Water weighs 1,000 grams/liter. Multiplying the specific gravity of the ink by 1,000 grams will give the grams per liter weight of the ink. Thus: 1.287×1,000 grams=1,287 grams/liter $$\%\ VOCs \times INK\ GRAMS/LITER = VOC\ GRAMS/LITER \quad (3)$$

To determine grams of VOCs per liter, multiplying the percentage by weight of VOCs in the formula by the ink's gram weight per liter.

The standard HydroSet GCMI 74 Red contains 9.9% ethylene glycol and 16.2% diethylene glycol, both of which are VOCs. In addition, the formula contains up to 2.5% MEA, an amine, which is another VOC. This gives a total of 28.6% VOCs by weight. Thus: 0.286×1,287 grams=368 grams/liter.

The solvents shown below represent the liquid portions of the resin solution and any free liquid incorporated into the ink. This does not include the water possibly present in the pigment dispersion. Solvents used were ethylene glycol (EG); glycerine (GON); diethylene glycol (DEG); Polyglycol E300 (P300); propylene glycol (PG) and water.

Tack Stability Tests were conducted using a Model B45 (manual) Thwing-Albert Inkometer at 800 RPM. Tack readings were made at 1, 2, 3, 4, and 5 minutes of elapsed time. Samples that showed good stability were run longer. Two samples demonstrated excessive tack increases and were removed from the Inkometer well before 5 minutes had elapsed. The tack increase values shown in Table 4 are the difference between the 5 minute reading and the 1 minute reading.

TABLE 4

| RESIN | % SOLVENT | SOLVENT VOC (gms/L) | TACK INCREASE |
|---|---|---|---|
| Maleic/Acrylic (standard) | 9.9 EG | 336 | 5.4 |
|  | 16.2 DEG | g./liter |  |
| Maleic | 28.2 P300 | 0 | 0 |
|  | 11.0 GCN | g./liter |  |
| Maleic | 17.6 DEG | 227 | 0 |
|  | 10.8 GCN | g./liter |  |
|  | 6.5 P300 |  |  |
| Maleic/Acrylic | 18.8 P300 | 0 | 2.7 |
|  | 9.2 H$_2$O | g./liter |  |
| Maleic/Acrylic | 33.0 P300 | 0 | 3.6 |
|  | 8.5 H$_2$O | g./liter |  |
| Maleic/Acrylic | 18.8 PG | 242 | 12.3 |
|  | 11.0 GCN | g./liter | (at 3 min.) |
| Maleic/Acrylic | 18.8 PG | 242 | 16.7 |
|  |  |  | (at 3 min.) |
|  | 11.0 P300 |  | 27.2 |
|  |  |  | (at 4 min.) |

The tack for the standard formula (i.e. HydroSet) had increased 15.2 points at 10 minutes and began decreasing at 11.5 minutes, which was an indication that the ink was drying on the print rollers. The polyglycol/glycerine solvent combination showed no tack increase at 10 minutes and had an increase of only 0.2 points after 15 minutes. The polyglycol/water solvent combination had a total tack increase of 6 points at 10 minutes.

EXAMPLE 4

Maleic/Acrylic resin ink formulations having different solvents were evaluated for tack and print appearance and compared to the standard (HydroSet). The results are shown in Table 5.

TABLE 5

| FORMULATION | TACK AND APPEARANCE |
|---|---|
| All glycerine Maleic/Acrylic resin | T-10 at 1–3 minutes T-11 at 4–20 minutes Appearance comparable to HydroSet with slightly faster drying. |
| Glycerine/DEG Maleic/Acrylic resin | Tack-11 at 1–20 minutes Transfer not as good as all glycerine formulation. |
| Glycerine/water Maleic/Acrylic resin | Dried on Inkometer. |
| Polyglycol E300/PG/Water/ Maleic/Acrylic | Dried on Inkometer, but Maintained some tack. |

The observations on the drying rates for the above formulas were summed up as follows:

TABLE 6

| Solvent | Drying Results (compared to Std.) |
|---|---|
| Glycerine | Comparable to Std. |
| Glycerine/Water | Faster than Std. |
| Glycerine/PG (or) Glycerine/DEG |  |
| PG/Water | Slower than Std. |
|  | Set comparable, final dry Slower than Std. |
| Polyglycol/PG/Water | Faster than Std. |

The results of the experimental data in Examples 1 to 4 clearly show that glycerine formulations are the best suited to give printing results that are comparable to the commercial standard (HydroSet) without exceeding the 5 wt. % VOC limit.

The invention has been described in terms of preferred embodiments thereof, but is more broadly applicable as will be understood by those skilled in the art. The scope of the invention is only limited by the following claims.

What is claimed is:

1. A printing ink composition comprising:

(a) resin; and (b) above 30 wt. % glycerine;

wherein said composition has less than 5 wt. % of volatile organic compounds and has no hazardous air pollutants.

2. The composition of claim 1 having less than 3 wt. % volatile organic compounds.

3. The composition of claim 1 wherein the resin is a maleic resin.

4. The composition of claim 1 wherein the resin is an acrylic resin.

5. The composition of claim 1 wherein the resin is a combination of maleic and other resins.

6. The composition of claim 1 wherein the amount of glycerine ranges from above 30 wt. % to about 80 wt. %.

7. A printing ink composition comprising resin, glycerine and monoethanolamine, wherein said composition has less than 3 wt. % volatile organic compounds and has no hazardous air pollutants.

8. A method for formulating aqueous letterpress or flexographic printing ink compositions containing as basic components resin, a colorant and a solvent, comprising incorporating glycerine as said solvent in a sufficient amount to solubilize said resin, such that said resulting ink composition has less than 5 wt. % of volatile organic compounds and has no hazardous air pollutants.

9. The method of claim 8 wherein the ink composition has less than 3 wt. % volatile organic compounds.

10. The method of claim 8 wherein the resin is a maleic resin.

11. The method of claim 8 wherein the resin is an acrylic resin.

12. The method of claim 8 wherein the resin is a combination of maleic and other resins.

13. The method of claim 8 wherein the amount of glycerine used is above 30 wt. % to about 80 wt. %.

14. A printing ink composition consisting essentially of resin and glycerine; wherein said glycerine is present in an amount sufficient to solubilize said resin, and wherein said composition has less than 5 wt. % of volatile organic compounds and has no hazardous air pollutants.

15. The composition of claim 14 having less than 3 wt. % of volatile organic compounds.

16. The composition of claim 14 wherein the resin is a maleic resin.

17. The composition of claim 14 wherein the resin is an acrylic resin.

18. The composition of claim 14 wherein the resin is a combination of maleic and other resins.

19. The composition of claim 14 wherein the amount of glycerine ranges from above 30 wt. % to about 80 wt. %.

* * * * *